United States Patent [19]

Kadan et al.

[11] 4,219,469

[45] Aug. 26, 1980

[54] EXTRACTION OF COTTONSEED AND CONCENTRATES TO IMPROVE THE COLOR OF PROTEIN ISOLATE

[75] Inventors: Ranjit S. Kadan, New Orleans; George M. Ziegler, Jr., Harahan; James J. Spadaro, New Orleans, all of La.

[73] Assignee: The United States of America as represented by the Secretary of Agriculture, Washington, D.C.

[21] Appl. No.: 943,893

[22] Filed: Sep. 19, 1978

[51] Int. Cl.² .................................................. A23T 1/14
[52] U.S. Cl. ................................... 260/123.5; 426/656
[58] Field of Search .................................... 260/123.5

[56] References Cited

U.S. PATENT DOCUMENTS

| | | | |
|---|---|---|---|
| 2,950,198 | 8/1960 | King et al. | 260/123.5 |
| 3,557,168 | 1/1971 | Pons et al. | 260/123.5 |
| 3,714,210 | 1/1973 | Schweiger et al. | 260/123.5 |
| 3,721,569 | 3/1973 | Steinkraus | 260/123.5 |
| 3,734,901 | 5/1973 | Hayes et al. | 260/123.5 |
| 3,814,748 | 6/1974 | Olson et al. | 260/123.5 |
| 3,828,017 | 8/1974 | Finley et al. | 260/123.5 |
| 3,941,764 | 3/1976 | Hensarling et al. | 260/123.5 |
| 3,998,800 | 12/1976 | Youngquist | 260/123.5 |

OTHER PUBLICATIONS

Gheyasuddin et al., *Food Tech.*, vol. 24, (1970), pp. 242, 243.
Kim et al., *Cereal Sci. Today*, vol. 16, (1971), pp. 216 & 217.
Eldrige et al., *Cereal Chem.*, vol. 48, (1971), pp. 640-646.
Honig et al., *J. Food Sci.*, vol. 41, (1976), pp. 642-646.

*Primary Examiner*—Walter C. Danison
*Attorney, Agent, or Firm*—M. Howard Silverstein; David G. McConnell; Raymond C. Von Bodungen

[57] ABSTRACT

The undesirable coloration generally found in cottonseed and other oilseed protein isolates prepared from oilseed flours or concentrates is substantially eliminated or improved by treatment of the flours with a specific solvent mixture containing a non-polar solvent, a polar solvent, a quantity of water, and a small quantity of a food-grade organic acid. The improved isolates render the consumer product more acceptable from the point of view of improved coloration.

13 Claims, No Drawings

EXTRACTION OF COTTONSEED AND CONCENTRATES TO IMPROVE THE COLOR OF PROTEIN ISOLATE

BACKGROUND OF THE INVENTION

1. Field of the Invention

This invention relates to the preparation and improvement of protein isolates. Specifically, this invention relates to the extraction of oilseed flour with solvent mixtures. Under some conditions certain azeotropic mixtures are preferred.

2. Description of the Prior Art

In order to better comprehend the state of the art it is necessary to understand certain facts. The currently abundant supply and relatively low per unit cost of oilseed proteins make them very attractive for improving the nutritional and functional performance of fabricated foods. Nevertheless, the vegetable proteins must meet certain unique color, taste, functional, and nutritional requirements indicated by the food industry. Currently the food industry produces three major classes of edible plant protein products to meet the specific food application need. These are flours, concentrates, and isolates. The Federal Register proposed certain standards of identify and definitions for these protein food products (see Vol. 39, No. 116, pp. 20891-20895, June 14, 1974). These pages indicate that a product having less than 65% protein (6.25 times the nitrogen content value) on moisture-free basis should be called "flour", a product having between 65% and 90% protein should be called "concentrate", and a product having above 90% protein should be called "isolate". The source of these protein products (cottonseed, soybean, etc.) must be identified because of the biochemical differences between the plant materials. Thus, according to the above definition the cottonseed protein isolate would be a protein product having at least 90% (6.25×N) and must be derived from cottonseed.

It is well known that "glanded cottonseed" contains about from 1% to 2% gossypol (lipid, moisture-free basis), and that it must be either physically removed or it must be bound to the protein by the application of heat and moisture to process it into meal (flour) for animal consumption. Hexane, the common solvent used for defatting oilseed, removes only trace amounts of gossypol during extraction. There are a number of patent and other disclosures in the literature which describe processes for removing free gossypol from the cottonseed to render it safe for animal consumption.

William H. King, et al. in their U.S. Pat. No. 2,950,198, disclose a process for removing unbound (free) gossypol and lipids without cooking the meats or the flakes of cottonseed by utilizing a mixture of acetone, hexane and water.

Walter A. Pons, et al. in their U.S. Pat. No. 3,557,168, disclose a process for extracting cottonseed with acetone or mixtures of acetone and hexane wherein most of the gossypol is removed.

Thomas P. Hensarling, et al. in their U.S. Pat. No. 3,941,764, disclose the use of a mixed solvent system that purportedly "extracts more lipid from cottonseed than hexane alone, without disrupting pigment glands or extracting amounts of pigment prohibitive to commercial applications". This mixed solvent system includes the use of acetic acid.

These processes of the prior art yield good results in the preparation of meal which is suitable for animal feed; however, it should be noted that the products are not acceptable for human consumption for one reason or another. The Pons method, for example, yields an inedible meal product because of its "catty odor", and when utilized to produce the isolate the method is unsatisfactory because of the additional disadvantage that the isolate produced from this meal is unacceptable dark colored. Theoretically, it is believed that when acetone is employed as the extracting solvent the acetone dimerizes the diacetone alcohol to yield mesityl oxide or its reaction with sulfhydryl moieties of the flour (proteins or polypeptides).

The King process, likewise, suffers from the same disadvantages. To produce an isolate that is untainted is impossible because, as indicated by those skilled in the art, acetone does not remove bound gossypol since it is not soluble therein. The Hensarling process denatures the protein in the meal so excessively that it cannot be processed into a protein isolate product. The particular application of acetic acid may well be the source of this problem.

It should be noted that efforts by processes of the prior art in producing light-color cottonseed protein isolate have not been fruitful. U.S. Pat. No. 3,814,748, discloses a process for improving the *color* of cottonseed protein isolate. The crux of said process lies in the performance and completion of the indicated steps within a prescribed period of less than about 30 minutes of time. This, of course, is obviously impractical, since in actual practice it has been difficult to complete the process steps within the recommended period of time in commercial production conditions.

In *Food Technology* 24:242 (1970) S. Gheyasuddin, et al describe a process of improving the color of sunflower protein, isolate by extracting the sunflower protein flour with 0.25% aqueous sodium sulfite at pH 10.5 and then extracting the protein isolate at its isoelectric point (pH 5) with about 50% aqueous isopropanol. However, M. K. Kim, et al (see *Cereal Science Today* 16:216 (1971) applied the Gheyasuddin process with glandless cottonseed flour but could not produce an improved color of the isolate.

The exact nature of the color-causing components has not been determined; however, preliminary investigations by the Southern Regional Research Center in New Orleans and Texas Agricultural and Mechanical University in College Station, Texas indicate that these compounds belong to the gossypol and flavonoid groups. More, it appears that these color components are intimately "tied" with the protein particles and therefore are not removed either during lipid extraction by hexane or subsequent alkaline protein extraction and water-washing of the protein isolate. Further research at the SRRC has indicated that gossypol is the major cause of color problem in cotton seed protein isolate preparation from cottonseed flour. Gossypol is also known to be extremely reactive and prone to oxidation during processing, especially in an alkaline medium (encountered during isolate preparation). Investigation has shown that nearly all the free and bound gossypol of the original starting cottonseed flour is transferred into cottonseed protein isolate as bound gossypol.

The addition of acetic acid in the extracting solvent mixture (instead of citric acid) was evaluated in this work, and it was determined that the use of acetic acid denatured the cottonseed protein excessively, to the point that the extracted flour was not suitable for isolate preparation. Also, the use of acetic acid did not result in significant improvement in the color of isolates.

The prior art teaches the improvement of *flavor* of oilseed protein products, specific concern for soybean oilseed being most evident. The presence of polar lipids (phospholipids) has been presumed to be the main cause of the flavor problems. Investigators of the flavor problems have dealt with the problems and with the reextraction of defatted oilseed flour by a second solvent mixture, as evidenced by U.S. Pat. No. 3,734,901, issued to L. P. Hayes, et al; A. C. Eldridge, et al in Cereal Chemistry 48:640, 1971; and D. H. Honig, et al in J. Food Science, Vol. 41, p. 642, 1976.

SUMMARY OF THE INVENTION

A defatted oilseed protein material is mixed with a solvent mixture consisting of a non-polar solvent, a polar solvent, water, and a small quantity of a food-grade acid. The mixture is thoroughly stirred, and the solids are separated. The solids are than desolventized and a flour or concentrate product is obtained. This product is further processed in order to prepare the pertinent protein isolate. The isolate thus obtained is suitable for use in food products for human consumption, their *color* and *odor* being superior.

The main object of the instant invention is to provide a means of obtaining an improved coloration in food products fabricated for human consumption. This is achieved by the process of the present invention.

DESCRIPTION OF THE PREFERRED EMBODIMENTS

Hexane-wet cottonseed protein food products such as, for example, LCP filter cake (see the Liquid Cyclone Process, U.S. Pat. No. 3,615,657) and glandless solvent-damp defatted flakes, or desolventized cottonseed protein products such as, for example, LCP flour or concentrate and glandless flour, are further processed by extracting with a solvent mixture consisting of a non-polar solvent, a polar solvent, a quantity of water, and a small quantity of food-grade acid. Obviously, from the economical and practical points of view, the extraction of hexane-damp material is preferred over the desolventized and dried material. The ratio of solvent mixture-to-meal during extraction, in the preferred embodiments of this invention, can vary between 1:1 to 10:1, depending upon the particular extraction conditions of a particular run. The excess solvent, after extraction has been completed, is removed either by decantation, filtration or by continuous centrifugation, here again depending upon the quantity involved, the timing required, or any other factor which might be of consequence in a particular run.

In selecting the ingredients for the solvent mixture the preparation is made with azeotropic conditions in mind. An azeotrope is preferred in order to provide a constant boiling mixture which would facilitate desolventizing. Nevertheless, an azeotropic mixture is simply "preferred", not required.

The preferred mixture of the process of the instant invention should have a boiling point lower than that of either hexane (b.p. 68° C.) or ethyl alcohol (B.P. 78.5° C.), and should boil preferably at about 50° C. The mixture should also accept incorporation of a certain quantity of water, and a relatively smaller quantity of a food grade acid when the best possible product is desired.

The quantity of water in the extracting mixture is adjusted so that the residual moisture content of the material, after the flour or concentrate has been extracted and desolventized, is between 3% and 10%. The quantity of water employed in the mixture depends upon the moisture content of the original oilseed material to be extracted.

The preferred ingredients of the solvent mixture are generally selected as follows: (1) the non-polar solvent is selected from the group consisting of hexane, petroleum ether, and ethyl ether, (2) the polar solvent is selected from the group consisting of ethyl alcohol, methyl alcohol, and ethyl acetate, and (3) the food-grade acid is selected from the group consisting of phosphoric acid, citric acid, ascorbic acid, lactic acid, and adipic acid. These acids are preferred because of their solubility in water, and the fact that none has an objectionable ordor.

The applicable *azeotropic mixture* of this invention is hexane: ethanol: water (HEW) in the weight ratio of 85:12:3, respectively. In the event that neither this azeotropic mixture nor a near-azeotropic mixture can be employed a suitable mixture can be employed provided the limits are held within these parameter: 50–95% of the non-polar solvent, 5–40% of the polar solvent, and 1–10% of the water. Regardless of these solvent proportions the quantity of food-grade acid can be varied from non (0.0%) to as much as 1.0% on a weight basis (HEWA).

The mechanism of the action of the hexane-alcohol-water and food-grade acid mixture with respect to the extraction of the cottonseed flour or concentrate and the subsequent improvement in the color of cottonseed protein isolate has, as of this writing, not been determined.

The gossypol values in Table Ia indicate that there is no significant reduction of gossypol content during HEWA extraction. Total gossypol content of starting material is 0.162%, and of HEWA extracted concentrate is 0.154%. Whereas there is substantial difference in the gossypol values of isolates from control and HEWA extracted concentrates (Table 1b). The total gossypol of isolate from control LCP concentrate is 0.226% while that of the isolate prepared by the process of the instant invention (HEWA extracted) is 0.074%.

Similarly, there is significant difference in the total gossypol values of residues (a byproduct of isolate preparation). The residue from HEWA extracted concentrate has higher gossypol content than the control.

In addition, the cottonseed concentrate extracted by mixture of isopropyl alcohol, hexane, and water was processed into protein isolate and the color of isolates was evaluated at the Southern Regional Research Center in New Orleans. No significant improvement in the color of isolate from isopropyl-treated flour was noticed as compared to the untreated control flour.

The extracted cottonseed protein concentrates prepared by both the Pons and the Hensarling processes were evaluated as a starting material for making protein isolate. The extracted material from the Hensarling method had typical acetic acid odor and did not suspend in alkaline water; therefore, was considered insuitable for isolate preparation. The material from the Pons process, on the other hand, was processed into isolate but the color of the isolate was considered objectionable and not significantly different from the control isolate.

Table Ia
Comparison of Gossypol contents of flours.

| Cottonseed Concentrate | Gossypol % | |
|---|---|---|
| | Free | Total |
| Starting LCP concentrate (control) | 0.028 | 0.162 |
| LCP concentrate extracted with HEWA (85:12:3:0.1 ratio) | 0.020 | 0.154 |

Table Ib
Distribution of gossypol during isolate preparation.

| Starting material | Products | Gossypol % | |
|---|---|---|---|
| | | Free | Total |
| LCP (control) | Isolate | 0.020 | 0.226 |
| | Residue | 0.015 | 0.078 |
| | Whey | 0.003 | 0.003 |
| HEWA extracted Concentrate | Isolate | 0.027 | 0.074 |
| | Residue | 0.010 | 0.181 |
| | Whey | 0.005 | 0.005 |

It is hypothesized that the hexane-alcohol-water mixture "conditions" the cottonseed protein-gossypol complex so that the gossypol is routed into the residue fraction (instead of the isolate). The mechanism of "conditioning" being unknown. The food-grade acids, such as citric acid, ascorbic acid, etc., merely protect the gossypol from oxidation during processing. These acids are known to be good chelating agents. The foregoing hypothesis forms no part of this invention. Regardless of the actual mechanism involved, the process of the present invention results in improvement of the color of cottonseed protein isolates.

The extraction and removal of excess solvent steps are generally carried out at temperatures of about from 10° to 50° C. The desolventization step is preferably done at temperatures of about from 55° to 100° C., to obtain a desolventized flour or concentrate with a residual moisture content of about from 3% to 10%. The total time required for the extraction and desolventization steps to be completed is generally about from 2 to 3 hours, which is considered satisfactory.

Projecting the applicability of the process of the instant invention, basing the projection on the chemistry of food, food product development, and intuitive extrapolation, it can be envisioned that the process would improve the color of other oilseeds, such as soybean, sunflower, sesame, and rapeseed protein isolates; furthermore, the protein isolate products from these oilseed would possibly have improved flavor and functional properties.

The following examples are provided to illustrate certain facets of the invention and must not be construed as limiting the invention in any manner whatever.

EXAMPLES

A series of seven samples was prepared and the results tabulated for comparative purposes (including a Control, 1A). The "preferred embodiments" will become self evident upon scrutinizing the data of Table II. Data applicable to the tabulation is presented chronologically, below, and arranged as follows: (A) Preparation of Cottonseed Protein Concentrates, (B) Preparation of Cottonseed Protein Isolates, and (C) Measurement of the Color of Isolates. Attention is called to the fact that the preparation of the isolates is not new. The invention lies primarily in the treatment preceding the preparation and in the correlation of this treatment with the isolate preparation from the flour or concentrate selected.

In selecting a flour for illustrative purposes a filter cake was prepared from glanded cottonseed, which was obtained from the high plains of Lubbock, Tex., the cake having been subjected to the sequence of steps comprising drying, flaking, disintegrating, screen-separating, and gravity separating as described in U.S. Pat. No. 3,615,657. In each of the seven isolate samples the initial cake had a 36% hexane content and about 2% moisture.

Solvent-wet filter cake prepared by the Liquid Cyclone Process (U.S. Pat. No. 3,615,657) was utilized to illustrate the process of the instant invention. This filter cake, when desolventized, contains 68% protein and is therefore considered to be a *concentrate;* however other starting mterial, such as, for example, glandless flour, glandless solvent-damp defatted flakes, LCP flour, etc. can be used. These are considered *flours* because of a lower protein content.

A. Preparation of Cottonseed Protein Concentrate

It was determined that a one pound wet filter cake quantity was suitable for each of the samples of the series designed. One pound aliquots of the LCP filter cake concentrate were either desolventized (see Control Sample 1A) or treated with the various solvent mixtures. The materials were desolventized at 82° C. under vacuum (about from 20 to 25 inches Hg for 2 hours) in every instance, then ground to a powder in a blender.

Sample 1A

A one-pound sample of the LCP filter cake was desolventized and ground to remove lumps in a laboratory blender. The desolventized flour had a moisture content of 2.5%. This was set aside and labeled "LCP Control Protein Concentrate".

Sample 2A

A one-pound sample of the LCP filter cake was suspended in a solvent mixture consisting of 507 grams of hexane and 173 grams of ethanol (HE). A portion of the solvent mixture was set aside to wash the filter cake. The solvent-to-meal ratio employed was 3:1, respectively. The mixture was stirred for about 30 minutes and then filtered through a nylon filter cloth. The filter cake thus obtained was desolventized as in Sample 1A, the control sample. The protein concentrate had a moisture content of about 2%.

Sample 3A

A one-pound sample of LCP filter cake was suspended in a mixture of 554 grams of hexane, 101 grams of ethanol, and 28 grams of deionized water (HEW). The mixture was stirred, filtered, and desolventized, as in Example 1A. The desolventized protein concentrate had a moisture content of 3.4%.

Sample 4A

A one-pound sample of LCP filter cake was treated as in 3A, except that the amount of deionized water in the solvent mixture was 31 grams, instead of 28. Here the desolventized protein concentrate had a 5.1% moisture content.

Sample 5A

A one-pound sample of LCP filter cake was treated as in 3A, except that the amount of deionized water added was 42 grams, instead of 28. The desolventized filter protein concentrate had a 9.1% moisture content.

Sample 6A

A one-pound sample of LCP filter cake was treated as in 4A, except that the solvent mixture had an added 0.85 grams of citric acid (HEWA) dissolved therein. The desolventized protein concentrate had a moisture content of 5.0%.

Sample 7A

A one-pound sample of LCP filter cake was treated as in 6A, except that 4.2 grams of citric acid was dissolved in the solvent mixture. The desolventized protein concentrate had a moisture content of 5.0%.

B. Preparation of Cottonseed Protein Isolates

The treated cottonseed protein concentrates were processed into isolates as follows: A 100 g quantity of each sample was suspended into 1000 ml. of 0.02 N NaOH. The pH of the slurry in each instance was adjusted to 10.0–10.5 by adding drop-wise 1.0 N NaOH and the mixture was then stirred for 30 minutes, and centrifuged at 1400×G for 10 minutes. The supernatant was decanted and the residue again suspended in 500 ml of deionized water, the pH adjusted to 10.0 with 1.0 N NaOH, reextracted for 30 minutes, and centrifuged again at 1400×G for 10 minutes.

The residue (the precipitate) was discarded and the two supernatant liquids combined. To prepare single isolates (classical protein isolate) the supernatant (protein extract) was adjusted to pH 5.0 by adding dropwise 1.0 N $H_3PO_4$. The protein isolate was centrifuged at 1400×G. The clean whey or supernatant was discarded in each instance. The precipitate was then suspended in deionized water, its pH adjusted to 7.0 with 1.0 N NaOH. It was either freeze-dried or spray-dried.

The production of freeze-dried isolates is merely a laboratory expedient in that it is suitable as a method of small-scale production. In freeze-drying the material is frozen and dried while the material stays frozen. This method is rather slow and expensive, from a commercial point of view. Then, of course, commercially the isolates are spray-dried. In this type of drying the product is dried by heated air (usually about from 170° to 215° C.). The color of most spray-dried products is usually darker than freeze-dried products because of the high temperatures involved in spray-drying.

C. Measurement of the Color of Isolates

Reflectance spectra of wafers prepared as outlined in U.S. Pat. No. 3,463,641 was obtained with a recording spectrophotometer, and the results obtained therefrom were tabulated (see Table II).

TABLE II

A COMPARATIVE STUDY OF THE COLOR IN ISOLATES

|  | Isolate Sample | Color$^{(L)}$ |
|---|---|---|
| *Isolate from 1A | (LCP concentrate Control) | 74.9 |
| *Isolate from 2A | (HE extracted concentrate) | 76.9 |
| *Isolate from 3A | (HEW extracted concentrate) | 82.5 |
| *Isolate from 4A | (HEW extracted, 5.0% $H_2O$) | 82.9 |
| *Isolates from 5A | (HEW extracted, 9.1% $H_2O$) | 83.2 |
| *Isolate from 6A | (HEWA extracted, 5% $H_2O$ plus 0.1% citric acid) | 83.5 |
| Isolate from 7A | (HEWA extracted, 5% $H_2O$ plus 0.5% citric acid) | 85.6 |
| **Isolate from 1A | (LCP concentrate Control) | 68.7 |
| **Isolate from 4A | (HEW extracted concentrate) | 75.0 |
| **Isolate from 6A | (HEWA extracted concentrate) | 77.1 |

*The isolate was prepared by the freeze-dried process.
**The isolate was prepared by the spray-dried process.
$^{(L)}$The values are presented with reference to Hunter's method of evaluating color, wherein the higher Hunter color value, the greater the whiteness.

Color evaluation was done by utilizing portions of the Hunter Laboratory Color System. The said color system uses "L" values expressed as numbers in the range of 0 to 100, and shade modifications are further expressed by "a" and "b" adjustments. Only the "L" values are employed in the evaluation of the samples produced by the process of the present invention. It should be noted that the higher the number the lighter the color. The products produced by the process of the invention and labeled as isolates 4A through 7A are of the improved coloration, the L value being in the range of about from 82.9 to 85.6. The isolate sample having a color value of 68.7 was definitely darker than the others. Table II delineates the isolates which were freeze dried by marking the area with an asterisk (*), and the area of the spray-dried isolates with two asterisks (**).

Table II shows that the cottonseed protein isolate made by the process of the present invention is preferred because the color is improved substantially, as can be verified by the L value; that is, the classical (single) protein isolate progressively improved in color with the addition of ethanol and increasing amounts of water and citric acid in the extracting solvent mixture. It should be noted also that the same effect—improvement of the color of the isolate—is observed in spray-drying of the protein isolates.

We claim:

1. A process for extracting oilseed protein flour and concentrate to obtain a light-colored protein isolate, the process comprising:
   (a) mixing an oilseed protein product with a solvent mixture consisting of a non-polar solvent, a polar solvent, water and a food-grade acid,
   (b) stirring the mixture to attain homogeneity,
   (c) separating the solids from the solvent mixture,
   (d) desolventizing the separated solids (a flour product), and
   (e) preparing the protein isolate from the desolventized solids.

2. The process of claim 1 wherein the non-polar solvent is selected from the group consisting of hexane, petroleum ether, and ethyl ether.

3. The process of claim 1 wherein the polar solvent is selected from the group consisting of ethyl alcohol, methyl alcohol, and ethyl acetate.

4. The process of claim 1 wherein the food-grade acid is selected from the group consisting of phosphoric acid, citric acid, ascorbic acid, lactic acid, and adipic acid.

5. The process of claim 1 wherein the quantity of non-polar solvent in the solvent mixture is about from 50% to 95% w/w.

6. The process of claim 1 wherein the quantity of polar solvent in the solvent mixture is about from 5% to 50% w/w.

7. The process of claim 1 wherein the quantity of water in the solent mixture is about from 1% to 10%, w/w.

8. The process of claim 1 wherein the quantity of foodgrade acid is not more than 1.0%, w/w.

9. The process of claim 1 wherein the separation of the solids from the solvent mixture in step (c) is done by filtration.

10. The process of claim 1 wherein the separation of the solids from the solvent mixture in step (c) is done by centrifugation.

11. The process of claim 1 wherein the desolventization is carried out at temperatures of about 55° to 100°.

12. The light-colored protein isolate produced by the process of claim 1, having a Hunter Color Value of at least 77.1 when spray-dried and at least about 83.5 when freeze-dried.

13. In a process for preparing an oilseed protein product having properties which are desirable in the fortification of fabricated foods by extracting an oilseed product with a hexane-alcohol-water mixture to improve the flavor of the final product by removal of polar lipids or other contaminants, the improvement wherein a defatted oilseed protein material is extracted with a hexane-alcohol-water mixture which further contains a small quantity of a certain food-grade acid to produce a treated (extracted) flour, which when further processed yields protein isolate products which have improved coloration and are suitable for human consumption.

* * * * *